(12) United States Patent
Nanri et al.

(10) Patent No.: US 7,950,504 B2
(45) Date of Patent: May 31, 2011

(54) DISK BRAKE

(75) Inventors: Keisuke Nanri, Minami-Alps (JP); Tomoji Sato, Minami-Alps (JP); Junichi Nagasawa, Kamakura (JP); Yoshimasa Matsui, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 952 days.

(21) Appl. No.: 11/709,815

(22) Filed: Feb. 23, 2007

(65) Prior Publication Data

US 2007/0199772 A1 Aug. 30, 2007

(30) Foreign Application Priority Data

Feb. 24, 2006 (JP) ................................. 2006-048843

(51) Int. Cl.
*F16D 55/18* (2006.01)

(52) U.S. Cl. ...................... 188/72.4; 188/72.1

(58) Field of Classification Search ................ 188/72.1, 188/71.3, 72.4, 72.5, 73.1, 73.4, 73.46, 73.47, 188/370

See application file for complete search history.

(56) References Cited

U.S. PATENT DOCUMENTS

| | | | | |
|---|---|---|---|---|
| 3,168,167 A * | 2/1965 | Walther | .................... | 188/73.45 |
| 3,999,635 A * | 12/1976 | Hotchkiss | .................... | 188/72.5 |
| 4,093,043 A * | 6/1978 | Smith | .................... | 188/73.46 |
| 5,826,686 A * | 10/1998 | Rike | .................... | 188/264 G |
| 6,367,595 B1 | 4/2002 | Mori et al. | | |
| 6,386,334 B2 * | 5/2002 | Wang | .................... | 188/72.4 |
| 2001/0019073 A1 | 9/2001 | Ezumi et al. | | |
| 2002/0166736 A1* | 11/2002 | Yunba | .................... | 188/72.5 |
| 2003/0217897 A1* | 11/2003 | Halasy-Wimmer et al. | . | 188/72.1 |
| 2005/0115780 A1* | 6/2005 | Nanri | .................... | 188/73.46 |
| 2005/0211508 A1* | 9/2005 | Roupp | .................... | 188/72.5 |
| 2006/0175156 A1 | 8/2006 | Sato et al. | | |

FOREIGN PATENT DOCUMENTS

| | | |
|---|---|---|
| DE | 33 33 152 | 3/1985 |
| DE | 33 38 822 | 5/1985 |
| EP | 1 122 453 | 8/2001 |
| EP | 1 132 167 | 9/2001 |
| GB | 2 131 507 | 6/1984 |
| JP | 5-248458 | 9/1993 |
| JP | 6-69456 | 9/1994 |
| JP | 11-197855 | 7/1999 |
| JP | 2000-42759 | 2/2000 |

* cited by examiner

*Primary Examiner* — Robert A Siconolfi
*Assistant Examiner* — Stephen Bowes
(74) *Attorney, Agent, or Firm* — Wenderoth, Lind & Ponack, L.L.P.

(57) ABSTRACT

A disk brake has a flange portion formed on the outer periphery of a portion of a caliper body main body where an opening is formed. The opening is used for insertion of a cutting tool for machining of a cylinder bore. The outer diameter of the flange portion is larger than that of a general surface of the outer peripheral wall of the bore formed in the caliper body main body. A lid member is secured to the opening by friction stir welding. The flange portion ensures a sufficient welding margin. The overall weight of the disk brake is reduced by minimizing the wall thickness of the general surface of the outer peripheral wall of the bore.

21 Claims, 16 Drawing Sheets

DISK BRAKE

BACKGROUND OF THE INVENTION

1. Field of the Invention

The present invention relates to a disk brake for use in a vehicle to brake the rotation of the axle, for example.

2. Description of Related Art

A disk brake used to brake a wheel of a vehicle has a cylinder provided on a brake caliper. A piston accommodated in a bore of the cylinder presses a brake pad against a disk in response to a fluid pressure, thereby applying a braking force to the wheel.

In one type of such a disk brake, the cylinder is divided into a bottom lid member and a tubular cylinder body having an opening that is closed with the lid member for the purpose of facilitating machining of the interior of the cylinder, for example. That is, after the interior of the cylinder body has been machined through the opening, the lid member is attached to the opening so as to close it. In this disk brake, installation of the lid member is performed as follows. An external thread formed on the outer periphery of the lid member is screwed to an internal thread formed on the inner peripheral surface of the opening of the cylinder body, thereby securing the lid member to the opening (for example, see Japanese Utility Model Application Publication No. Hei 6-69456).

In the above-described conventional disk brake, the peripheral wall of the opening of the cylinder body has an increased wall thickness to reliably support the lid member by the opening. The outer diameter of the outer peripheral wall of the bore of the cylinder body is set equal to or larger than the outer diameter of the portion of the cylinder body where the opening is formed. Therefore, it is likely that the whole cylinder body will increase in wall thickness and the overall weight of the device will increase unfavorably.

SUMMARY OF THE INVENTION

Accordingly, an object of the present invention is to provide a disk brake capable of reliably supporting the lid member by the opening of the cylinder body and yet allowing a reduction in the overall weight of the device.

The present invention provides a disk brake adapted to press a brake pad against a disk with a piston that slides in a bore of a cylinder in response to a fluid pressure. The cylinder includes a cylinder body having an opening at the bottom thereof and a lid member that closes the opening. The outer diameter of the outer peripheral surface of a portion at the bottom of the cylinder body where the opening is formed is larger than the outer diameter of a minimum outer diameter portion of the outer peripheral wall of the bore of the cylinder body.

According to the present invention, it is possible to reduce the thickness of the outer peripheral wall of the bore while ensuring a sufficient wall thickness for the peripheral wall of the opening of the cylinder body to reliably support the lid member. Therefore, it becomes possible to reduce the overall weight of the device without degrading the support strength for the lid member.

According to one aspect of the present invention, a small-diameter portion is formed on a region of the outer peripheral surface of the cylinder body that is adjacent to the outer periphery of the portion thereof where the opening is formed, thereby reducing the wall thickness of the cylinder body. Therefore, it becomes possible to reduce the overall weight of the device while ensuring a sufficient wall thickness for the peripheral wall of the opening of the cylinder body to increase the support strength for the lid member.

According to another aspect of the present invention, the lid member is joined to the opening of the cylinder body by friction stir welding. Therefore, the lid member can be integrally joined to the cylinder body reliably in a hermetically sealed state, in addition to the achievement of the above-described basic advantageous effects.

According to still another aspect of the present invention, a bulge portion is provided on the outer peripheral surface of the portion of the cylinder body where the opening is formed so that the bulge portion corresponds to a rib provided to connect a pair of cylinders, and the friction stir welding is performed so that a residual impression that is left at the friction stir welding completion position is formed in the bulge portion. Therefore, the residual impression formation position can be surely retreated to an area outside the lid member without increasing the overall wall thickness of the outer periphery of the portion of the cylinder body where the opening is formed. Accordingly, it is possible to reliably prevent occurrence of a fluid leakage and the like due to the residual impression.

According to a further aspect of the present invention, a chamfer is provided on the outer peripheral corner of the portion of the cylinder body where the opening is formed. Therefore, burrs are unlikely to occur on the outer periphery of the end surface of the cylinder body when subjected to milling.

According to a still further aspect of the present invention, the die parting direction when a brake caliper having the cylinder body is cast is substantially perpendicular to the axis of the disk. Therefore, it is unnecessary to provide a draft for release on the cylinder body from the opening side-end surface thereof toward the outer periphery of the bore. Accordingly, the brake caliper according to the present invention can be readily produced by casting.

The above and other objects, features and advantages of the present invention will become more apparent from the following description of the preferred embodiments thereof, taken in conjunction with the accompanying drawings.

DETAILED DESCRIPTION OF THE INVENTION

A first embodiment of the present invention will be described below in detail with reference to FIGS. 1 to 12.

Figure 1:
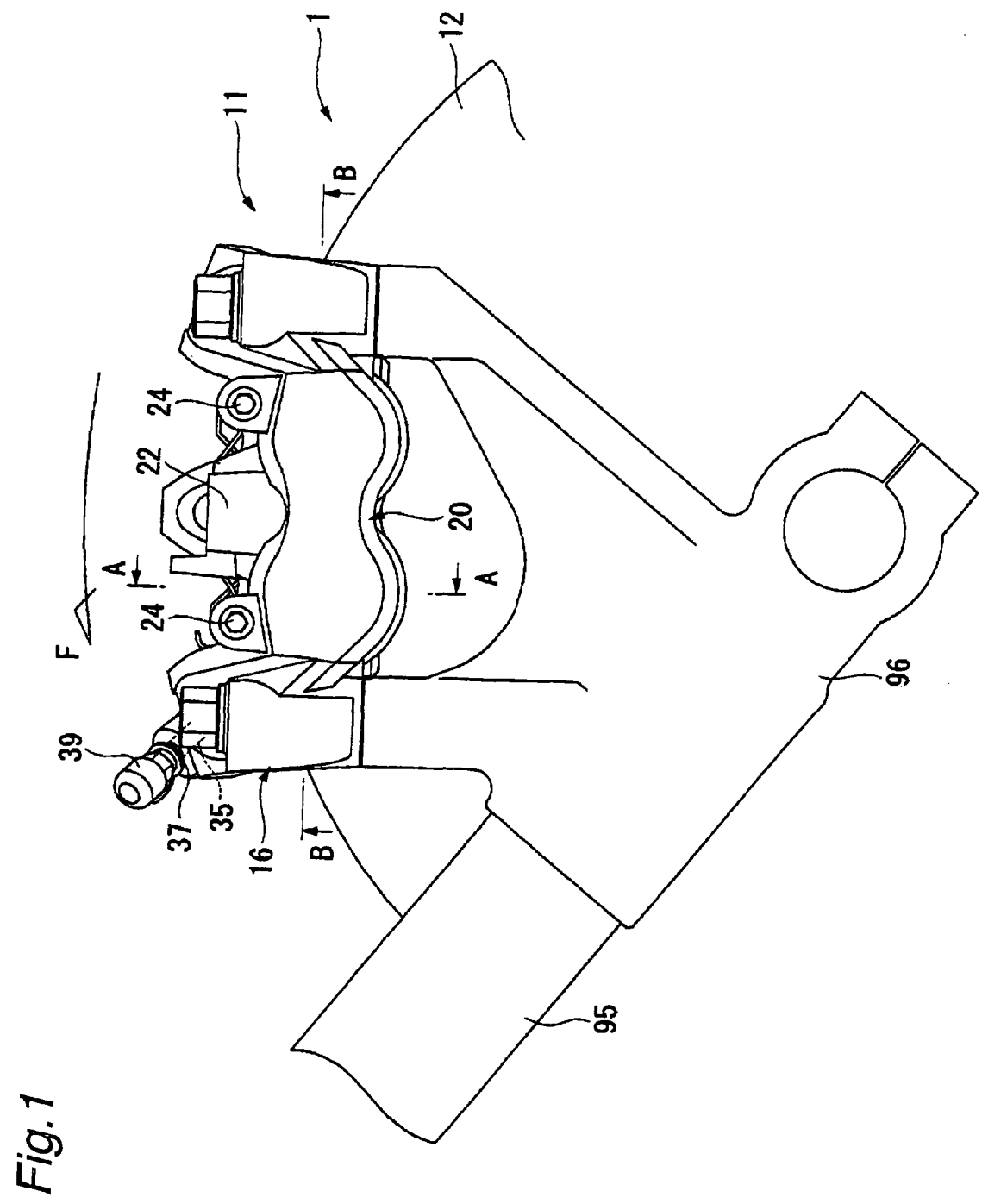
FIG. 1 is a front view of a disk brake according to a first embodiment of the present invention.

FIG. 1 shows a disk brake according to the present invention as applied to a motorcycle, by way of example. The disk brake 1 has a disk 12 that rotates together as one unit with a wheel (rotating member) to be braked. The disk brake 1 further has a caliper 11 that applies a frictional resistance to the disk 12. The caliper 11 is of an opposed piston type caliper having a caliper body 16 that extends over the disk 12 and that is secured to a non-rotating part 95 of the vehicle through a bracket 96. A plurality (particularly two in the embodiment) of pairs of pistons 17 (only one pair of pistons 17 are shown in the sectional view of FIG. 2) are slidably provided in the caliper body 16 in such a manner that the pistons 17 of each pair are opposed to each other across the disk 12. It should be noted that the following description will be made of the disk brake 1 as mounted on the vehicle, and that the radial direction of the disk 12 in the mounted state is referred to as "the disk radial direction". Further, the axial direction of the disk 12 is referred to as "the disk axial direction", and the circumferential direction of the disk 12 as "the disk circumferential direction". The arrow F in FIG. 1 indicates the rotational direction of the disk 12 when the vehicle is traveling forward.

The caliper body 16 has, as shown in FIGS. 1 to 6, an outer cylinder portion 20 disposed at the outer side of the disk 12 (i.e. at the side of the disk 12 remote from the wheel) and an inner cylinder portion (cylinder) 21 disposed at the inner side of the disk 12 (i.e. at the side of the disk 12 closer to the wheel). The outer cylinder portion 20 and the inner cylinder portion 21 are connected at the radially outer side of the disk 12 by a disk pass portion 22.

The caliper body 16 is provided with a plurality (particularly two in the embodiment) of pad pins 24 (see FIG. 1) spaced in the disk circumferential direction. The pad pins 24 extend between the outer cylinder portion 20 and the inner cylinder portion 21 along the disk axial direction.

The outer cylinder portion 20 and the inner cylinder portion 21 are provided with a plurality (particularly two in the embodiment) of pairs of bores 26 spaced from each other in the disk circumferential direction. The bores 26 of each pair are opposed to each other in the disk axial direction. The pistons 17 are slidably fitted in the bores 26, respectively. Thus, a plurality (particularly two in the embodiment) of pairs of bores 26, each pair consisting of two bores 26 opposed to each other in the disk axial direction, are formed in parallel in the disk circumferential direction, and a plurality (particularly two in the embodiment) of pairs of pistons 17, each pair consisting of two pistons 17 opposed to each other in the disk axial direction, are disposed in parallel in the disk circumferential direction.

Figure 2:
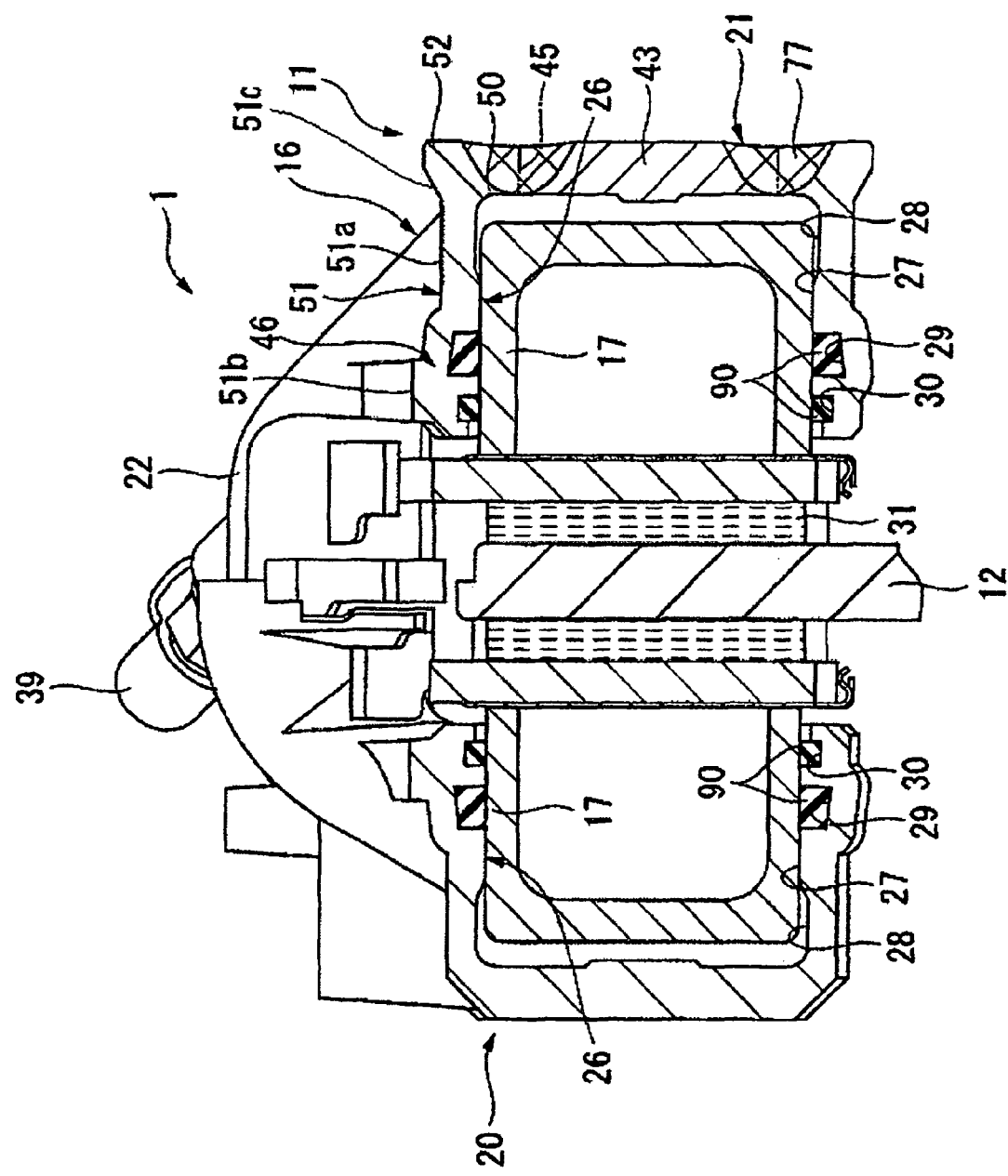
FIG. 2 is a sectional view corresponding to the section A-A in FIG. 1, showing the first embodiment.

Each bore 26 has, as shown in FIG. 2, a fitting bore portion 27 slidably fitted with a piston 17 and a large-diameter bore portion 28 located at the back of the fitting bore portion 27 and having a larger diameter than that of the fitting bore portion 27. A plurality (particularly two in the embodiment) of seal circumferential grooves 29 and 30 are formed in the inner peripheral wall surface of the fitting bore portion 27 at a substantially intermediate position in the axial direction thereof to retain piston seals 90.

Each pad pin 24 of the caliper body 16 supports a pair of brake pads 31 movably in the disk axial direction. That is, a total of two pairs of brake pads 31 are supported by the pad pins 24 (only one pair of brake pads 31 are shown in the sectional view of FIG. 2). The pads 31 are disposed at both sides of the disk 12 in the axial direction thereof and pressed against the disk 12 by the pistons 17, respectively, which are provided in the caliper body 16 so as to be positioned at the respective sides of the associated brake pads 31 remote from the disk 12, thereby generating a braking force to the vehicle. It should be noted that the caliper body 16 is formed with passages for introducing a brake fluid into the bores 26 to activate the pistons 17. Of these passages, communicating passages 35 and 36 for communication between the opposed bores 26 are bored in the caliper body 16 from the outside so as to intersect each other in the caliper body 16. A bleeder plug 39 for air bleeding is attached to an opening 37 of one communicating passage 35 that opens to the outside. An opening 38 of the other communicating passage 36 that opens to the outside is closed with a closing plug 40.

In the first embodiment, the caliper body 16, which has the outer cylinder portion 20, the inner cylinder portion 21 and the disk pass portion 22, is formed by machining from an integrally formed blank, e.g. an aluminum cast piece, except a part of the bottom of either of the outer and inner cylinder portions 20 and 21, particularly the inner cylinder portion 21 in the embodiment. Specifically, a discrete lid member 43 constitutes a part of the bottom of the inner cylinder portion 21.

In other words, the caliper body 16 consists essentially of the outer cylinder portion 20, the inner cylinder portion 21 and the disk pass portion 22. The inner cylinder portion 21 has an integrally formed caliper body main body (cylinder body) 46 having an opening 45 at the bottom of each bore 26. The inner cylinder portion 21 further has lid members 43 that close the openings 45 of the caliper body main body 46.

Each lid member 43 is formed in a disk shape from aluminum, for example, so as to have an outer diameter slightly smaller than the diameter of the associated opening 45 of the caliper body main body 46. The opening 45 has a straight inner peripheral surface with no step or the like. Similarly, the lid member 43 has a straight outer peripheral surface.

The opening 45 of the caliper body main body 46 is formed at the bottom of the bore 26 with a circular configuration coaxial with the bore 26. The inner diameter of the opening 45 is smaller than the inner diameter of the bore 26 (i.e. smaller than the inner diameters of the fitting bore portion 27 and the large-diameter bore portion 28). Consequently, an annular bottom wall 50 is formed at the bottom of the bore 26. The annular bottom wall 50 extends toward the axis of the bore 26 (i.e. radially inward) to form a peripheral edge of the opening 45. The wall thickness of the annular bottom wall 50 is set substantially the same as the wall thickness of the lid member 43.

Each opening 45 of the caliper body main body 46 is used as a machining opening for performing machining the interior of the caliper body main body 46 after it has been cast. For example, when machining of the opening 45 itself has been completed, or while the opening 45 is still in an unmachined state immediately after the caliper body main body 46 has been cast, the opening 45 is used as an insertion hole for a cutting tool to cut the fitting bore portions 27, the large-diameter bore portions 28 and the seal circumferential grooves 29 and 30 of the inner and outer cylinder portions 21 and 20.

Figure 9:
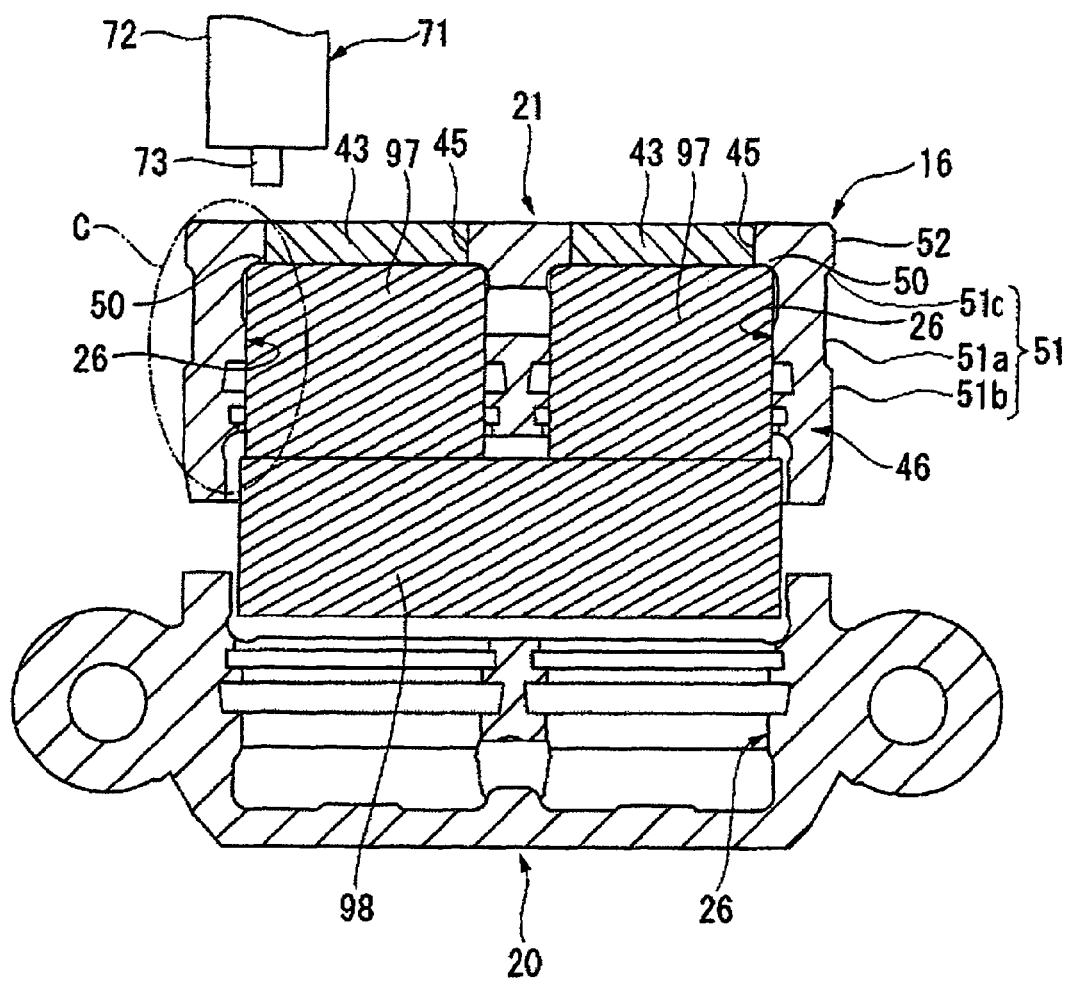
FIG. 9 is a sectional view showing the way in which lid members are attached to the caliper body in the first embodiment.
Figure 10:
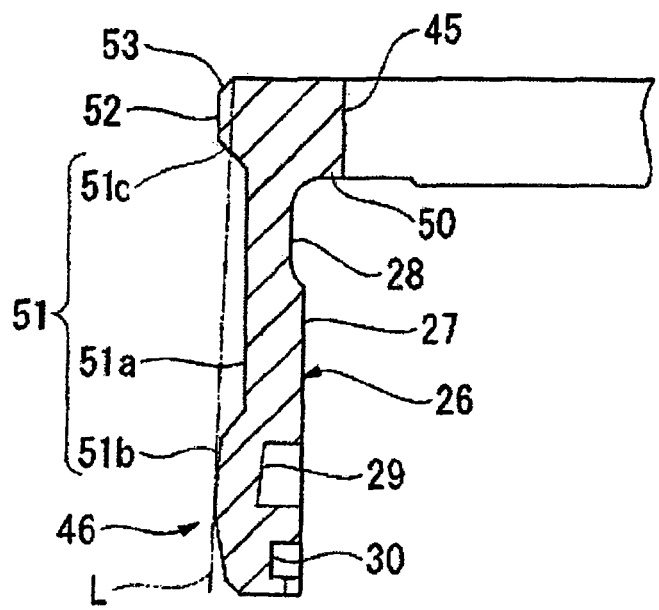
FIG. 10 is an enlarged view of part C in FIG. 9, showing the first embodiment.

The caliper body main body 46 has a flange portion 52 integrally formed on the outer periphery of a portion thereof where the openings 45 are formed. A section of the flange portion 52 associated with each bore has a larger outer diameter than that of a general surface 51a of an outer peripheral wall 51 of the bore 26 of the caliper body main body 46. It should be noted that the outer peripheral surface of the bore 26 is provided with a reinforcing bead 51b that reinforces the outer periphery of the seal circumferential grooves 29 and 30. The term "the general surface 51a" of the outer peripheral wall 51 as used in this embodiment shall mean a minimum outer diameter region located on the side of the reinforcing bead 51b closer to the bottom of the bore 26. The flange portion 52 is integrally formed by casting, together with the other portions of the caliper body main body 46, as will be described later. The flange portion 52 has, as shown in the enlarged view of FIG. 10, a chamfer 53 provided on the corner of the axial end surface thereof so as to narrow toward the axial end surface. The chamfer 53 contributes to preventing generation of burrs when the bottom-side end surface of the caliper body main body 46 is subjected to milling after the lid members 43 have been joined to the caliper body main body 46, as will be described later. The flange portion 52 and each general surface 51a (minimum outer diameter portion) are connected by a slant surface 51c that gradually increases in diameter toward the end surface of the caliper body main body 46. The slant surface 51c is provided on a region of the outer peripheral wall 51 adjacent to the outer periphery of a surface of the bottom of the caliper body main body 46 that borders the bore 26. The general surface 51a of the outer peripheral wall 51 extends, as shown in FIGS. 2, 9 and 10, away from the flange portion 52 as far as the neighborhood of the outer periphery of the seal circumferential groove 29. This structure is desirable from the viewpoint of achieving a weight reduction.

Figure 7:
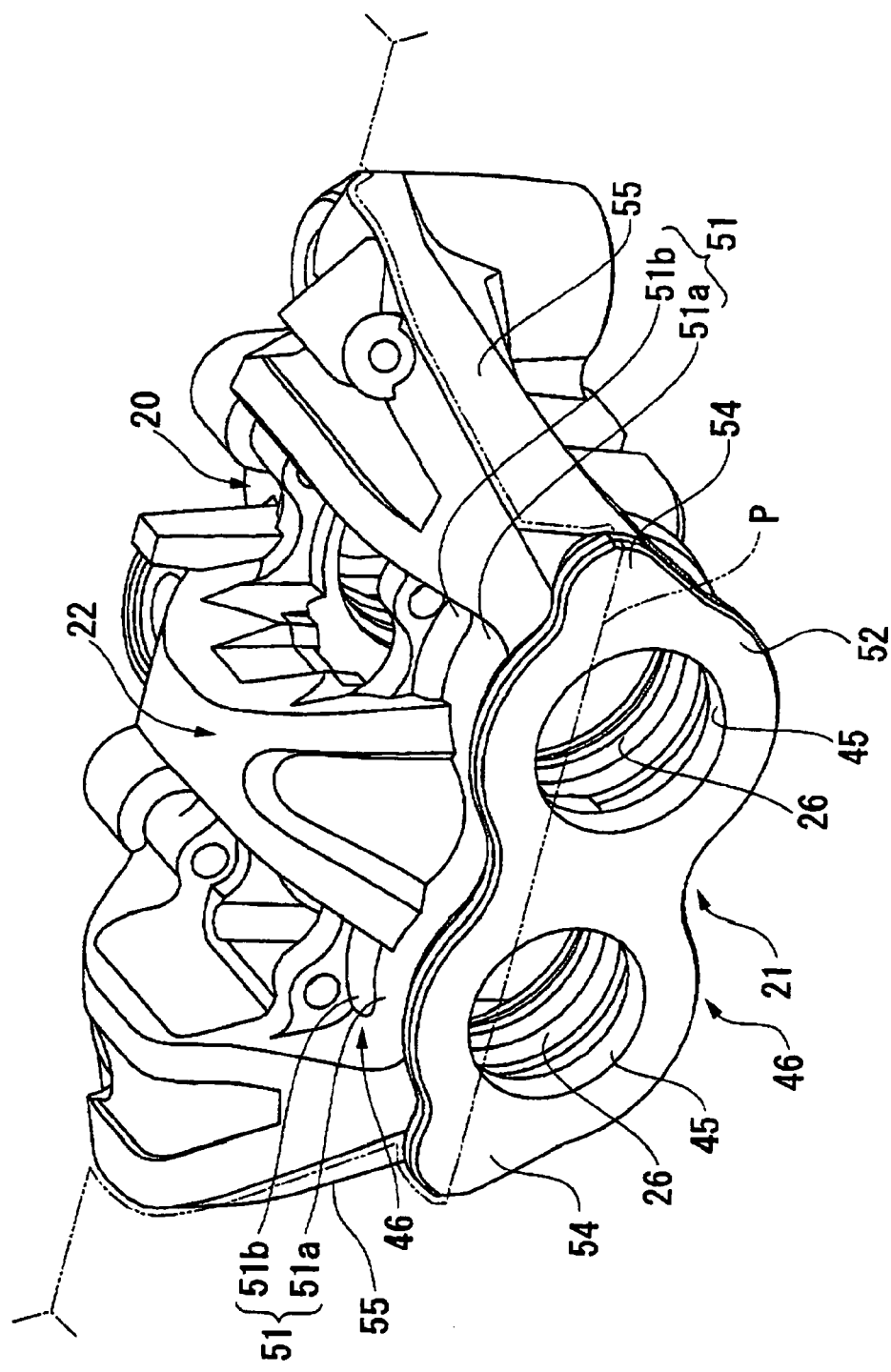
FIG. 7 is a perspective view of a caliper body, showing the first embodiment.
Figure 8:
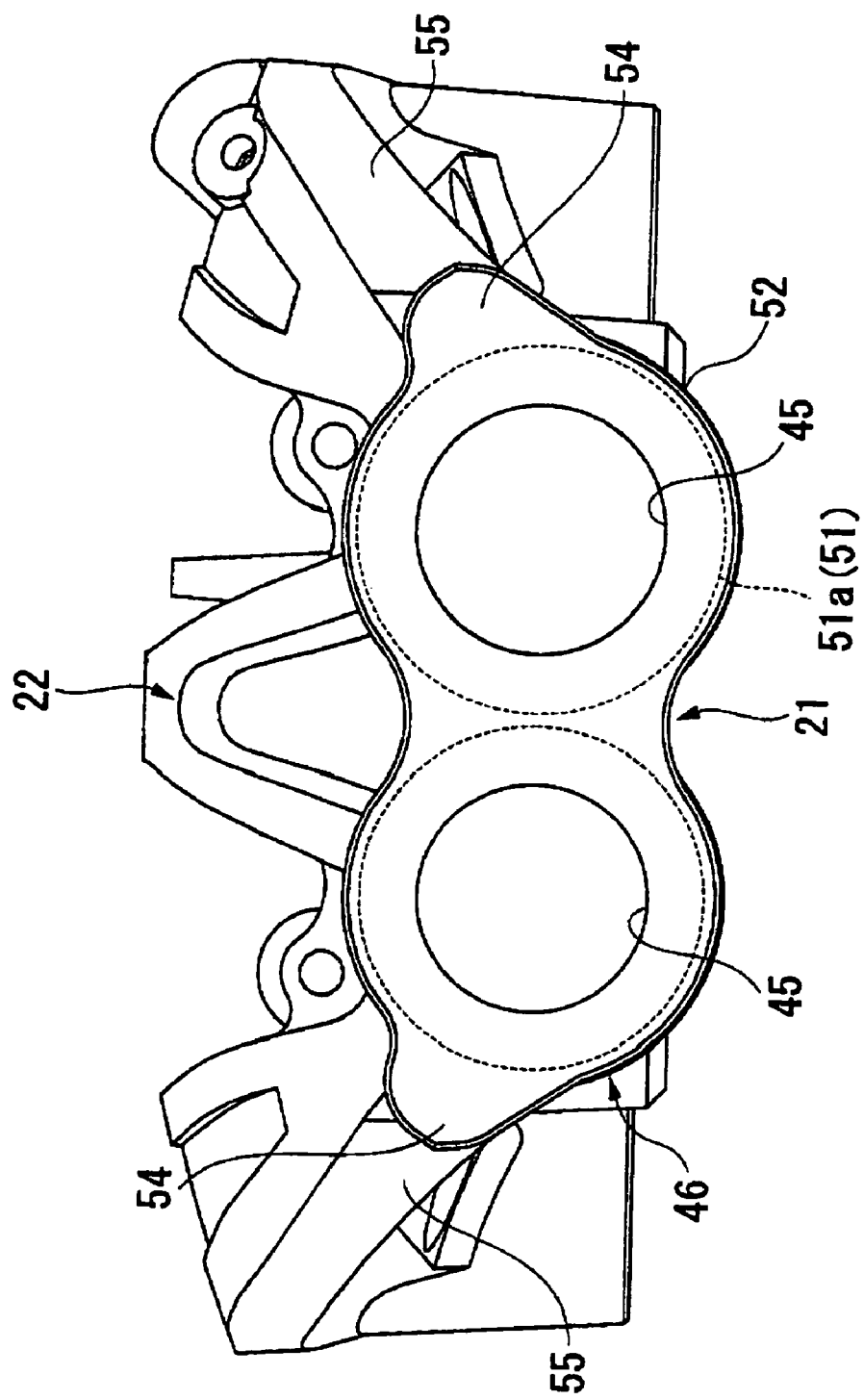
FIG. 8 is a rear view of the caliper body, showing the first embodiment.

The flange portion 52 at the bottom of the caliper body main body 46 is, as shown in FIGS. 7 and 8, substantially in the shape of an elongated loop connecting the peripheries of two ring sections. A radially outwardly projecting bulge portion 54 is contiguously provided on the end of each ring section opposite to the end thereof that is connected to the other ring section. The bulge portion 54 is formed at each end of the caliper body main body 46 in the disk circumferential direction. The bulge portion is formed from one end portion of each of ribs 55 that connect together the outer and inner cylinder portions 20 and 21, extending over the outer periphery of the disk 12. It should be noted that the term "the outer peripheral wall of the bore" as used in this specification shall not include any member or portion that connects a plurality of separate functional portions, such as the ribs 55 for reinforcement.

Figure 11:
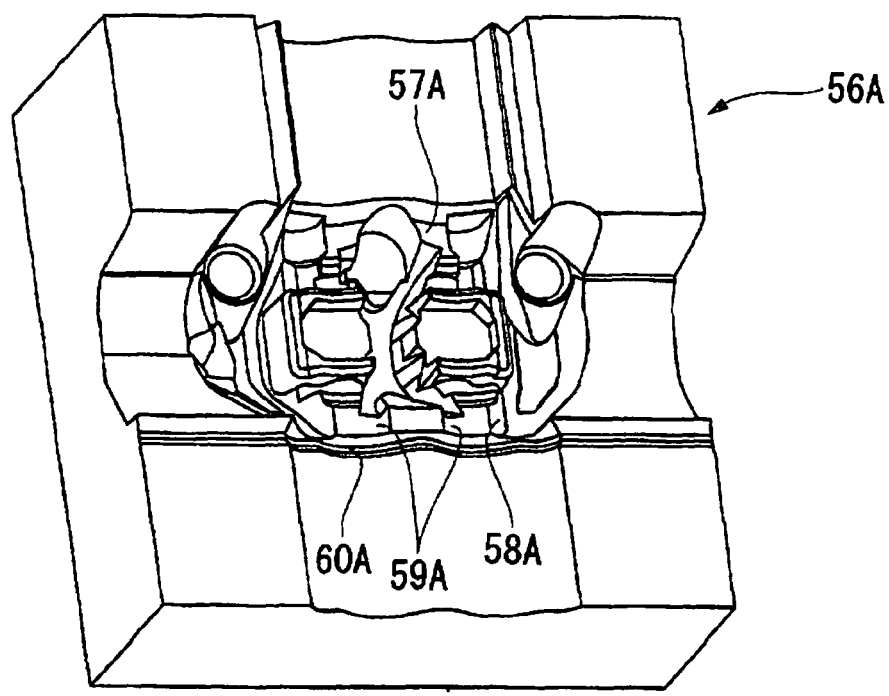
FIG. 11 is a perspective view of one block of a casting die for producing the caliper body of the first embodiment.
Figure 12:
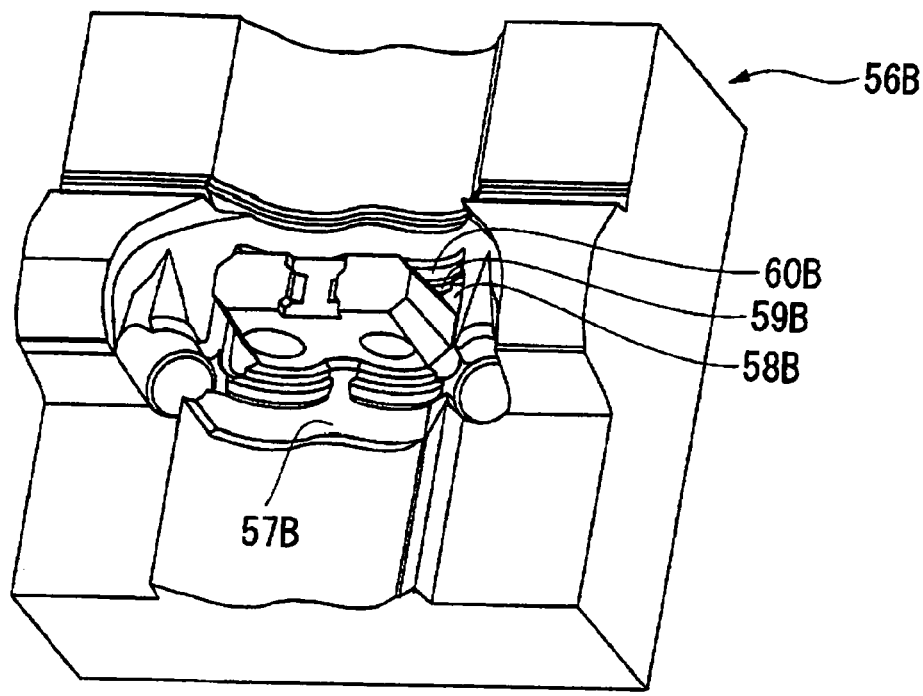
FIG. 12 is a perspective view of the other block of the casting die for producing the caliper body of the first embodiment.

The caliper body main body 46, which consists essentially of the outer and inner cylinder portions 20 and 21 and the disk pass portion 22, is shaped by using a pair of casting dies 56A and 56B as shown in FIGS. 11 and 12, for example. Assuming that the side of the caliper body main body 46 (the lower side as seen in FIG. 7) from which the disk 12 is inserted between the outer and inner cylinder portions 20 and 21 is referred to as "the lower side of the caliper body main body 46", the upper and lower dies 56A and 56B are formed so that a parting line P (see FIG. 7) substantially halves the caliper body main body 46 into upper and lower parts. It should be noted that reference numerals 57A and 57B in FIGS. 11 and 12 denote outer cylinder shaping portions that shape the outer cylinder portion 20, and reference numerals 58A and 58B denote inner cylinder shaping portions that shape the inner cylinder portion 21. Reference numerals 59A and 59B denote general surface shaping portions that shape the general surfaces 51a of the outer peripheral walls 51 of the bores 26 of the inner cylinder portion 21, and reference numerals 60A and 60B denote flange shaping portions that shape the flange portion 52 at the bottom of the inner cylinder portion 21.

When the casting dies 56A and 56B are used, the parting line P formed on the caliper body main body 46 is substantially parallel to the axis of each bore 26 and substantially perpendicular to a plane containing the rotational direction of the disk 12. With the casting dies 56A and 56B, the die release direction is vertical relative to the caliper body main body 46. Therefore, unlike the case where the cast product is released along the outer peripheral walls 51 of the bores 26, it is unnecessary to provide a draft on the outer peripheral walls 51 of the bores 26 so that the caliper body main body 46 narrows toward the bore bottom side thereof (i.e. toward the opening 45 side thereof).

Accordingly, the cast caliper body main body 46 can be removed from the casting dies 56A and 56B without any problem even if the flange portion 52 having a section of a larger outer diameter than that of the general surface 51a of the outer peripheral wall 51 of the associated bore 26 is provided at the bottom of the bore 26 as stated above.

Incidentally, the caliper body main body 46, after being cast, is subjected to cutting to shape the interior thereof through each opening 45 at the bottom. Thereafter, the lid member 43 is fitted to each opening 45 by friction stir welding (FSW) as stated below.

A joining tool 71 used in the friction stir welding process has, as shown in FIG. 9, a circular-columnar large-diameter shaft portion 72 and a circular-columnar tip shaft portion 73 smaller in diameter than the large-diameter shaft portion 72 and coaxial therewith. It should be noted that a specific method of friction stir welding using the joining tool 71 is shown, for example, in FIGS. 12A to 12C of U.S. Pat. No. 5,460,317.

To install the lid members 43, as shown in FIG. 9, circular columnar support posts 97 made of iron that have substantially the same diameter as those of the fitting bore portions 27 of the bores 26 are inserted into the bores 26, respectively, of the inner cylinder portion 21 of the caliper body main body 46 from the inner side (opposite to the openings 45). The tops of the support posts 97 are brought to abut against the respective annular bottom walls 50 at the bottoms of the bores 26, and the base portions of the support posts 97 are supported by a support device (not shown) through a base post 98. Next, the lid members 43 are fitted into the openings 45, respectively, from the outer side of the caliper body main body 46 (i.e. from the outer side of the bottoms of the bores 26), and the back sides of the lid members 43 abut against the respective tops of the support posts 97. At this time, in each bore 26, the annular bottom wall 50 and the lid member 43 abut against the top of the support post 97 and are positioned with respect to each other at the back side thereof on the top of the support post 97, which is used as a reference plane. Consequently, the outer surfaces of the annular bottom wall 50 and the lid member 43, which have the same wall thickness, are flush with each other without a step therebetween.

Figure 3:
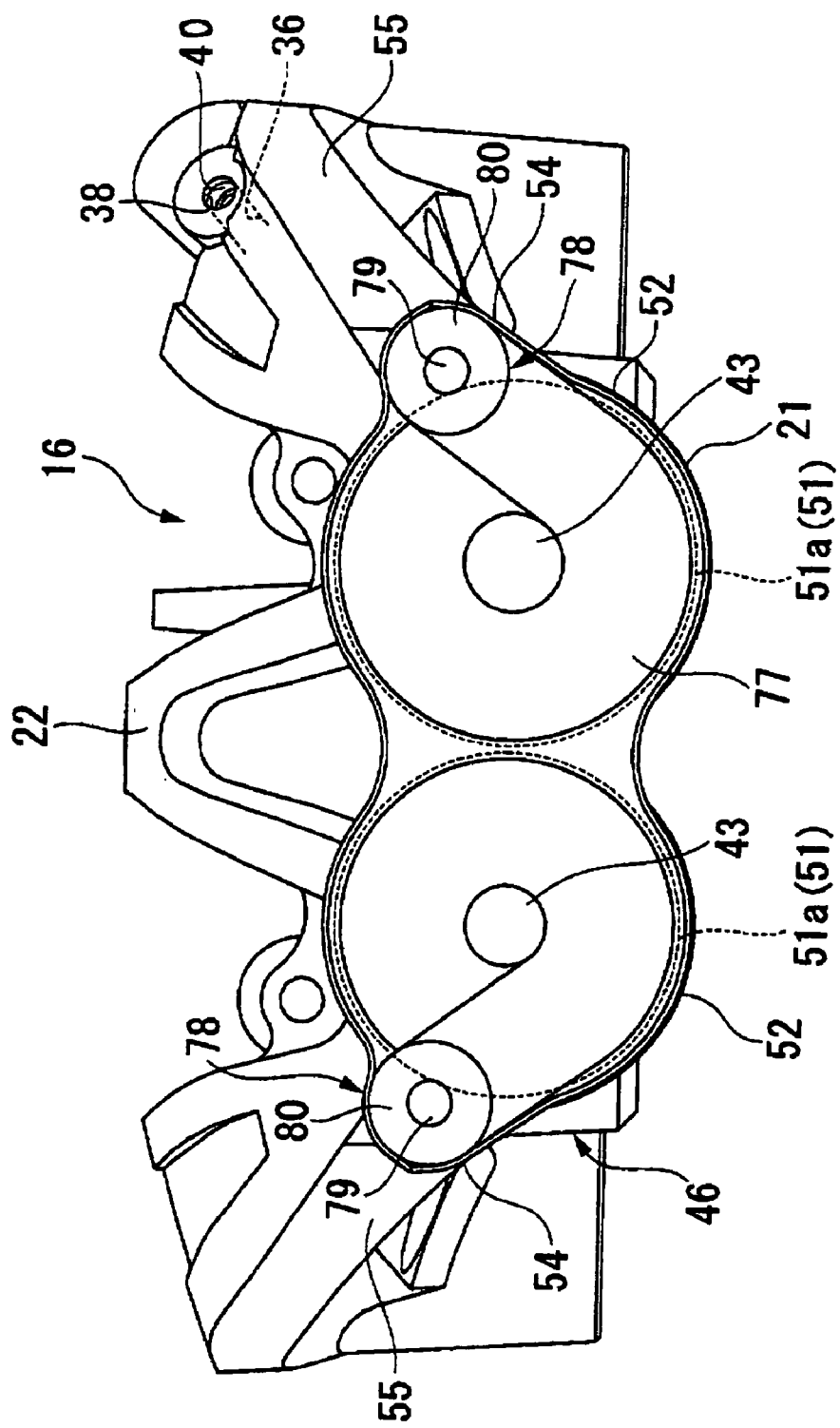
FIG. 3 is a rear view of a caliper body, showing the first embodiment.
Figure 4:
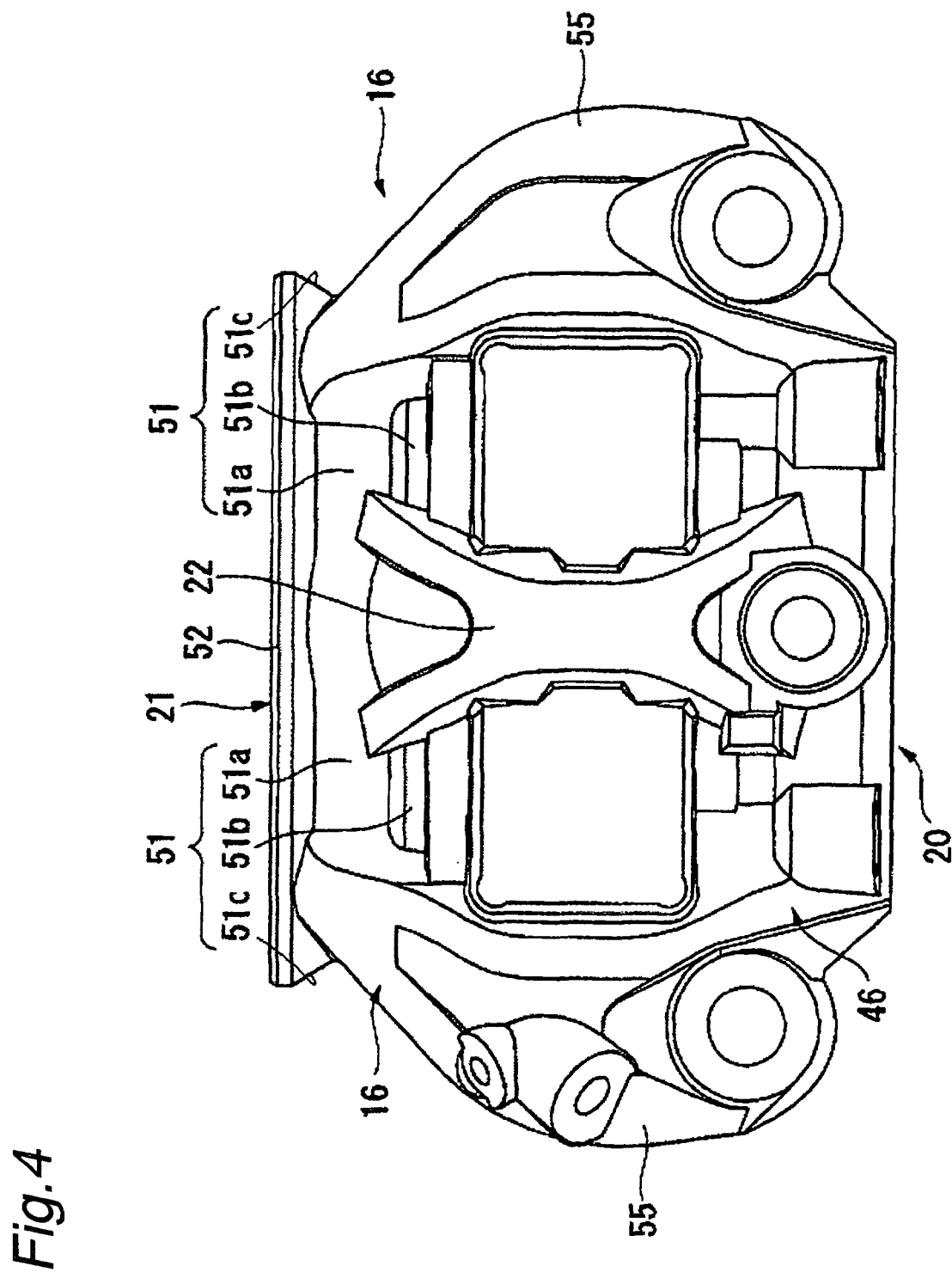
FIG. 4 is a top view of the caliper body, showing the first embodiment.
Figure 5:
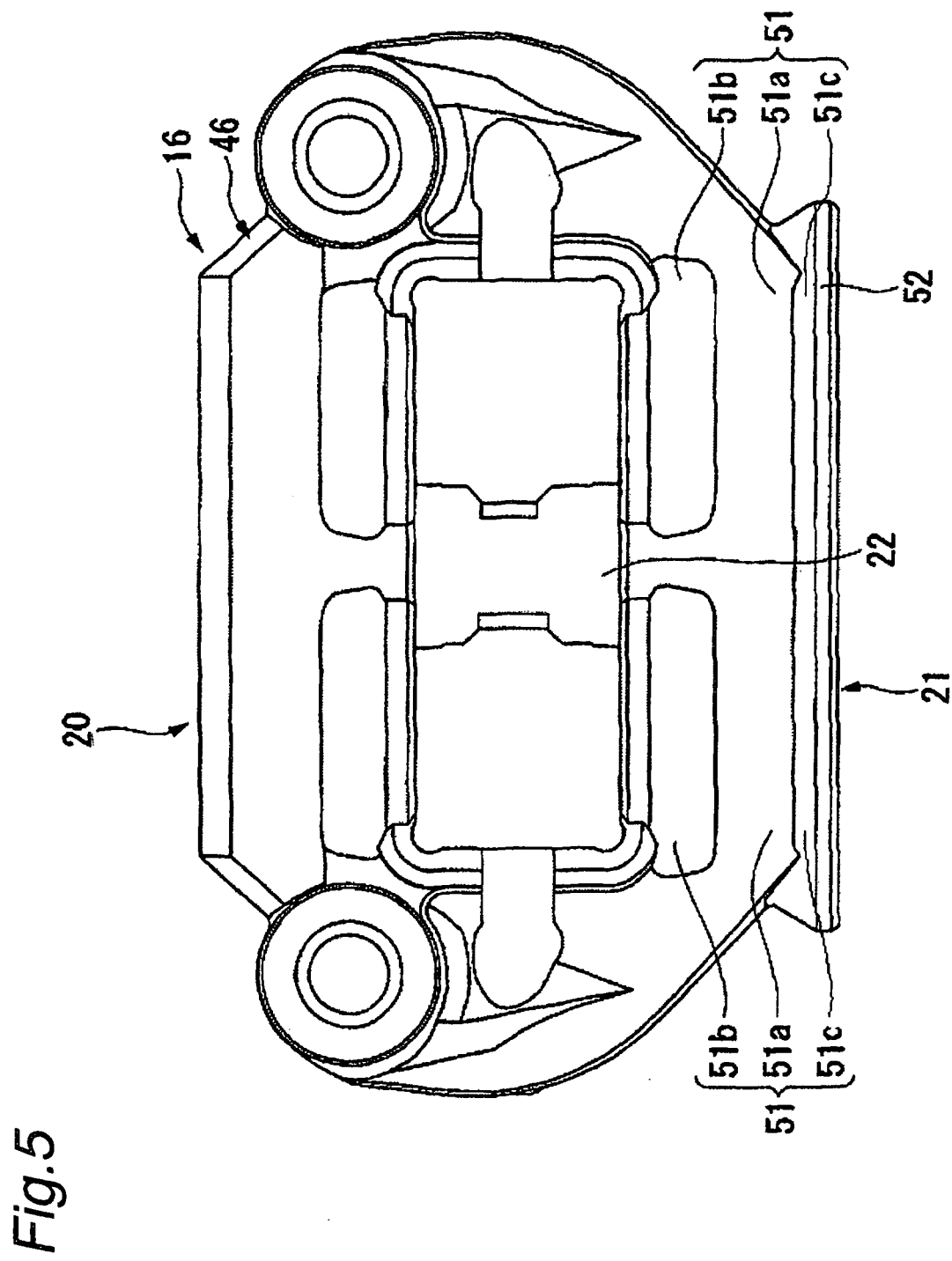
FIG. 5 is a bottom view of the caliper body, showing the first embodiment.
Figure 6:
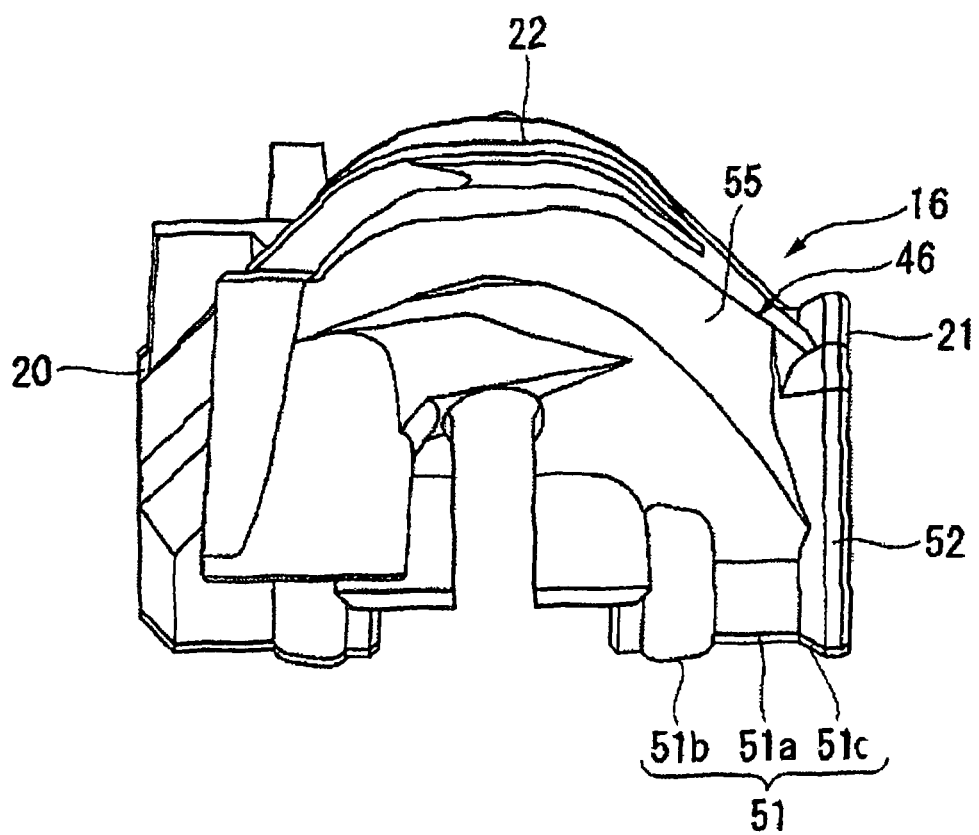
FIG. 6 is a side view of the caliper body, showing the first embodiment.

In this state, friction stir welding (FSW) is applied to the joint interface between the opening 45 and the lid member 43. That is, as shown in FIG. 3, the tip shaft portion 73 of the joining tool 71 is continuously moved along the joint interface between the opening 45 and the lid member 43 to perform friction stir welding in a loop over the entire circumference of the lid member 43. It should be noted that reference numeral 79 in FIG. 3 denotes a hole left after the completion of the friction stir welding process in which the tip shaft portion 73 of the joining tool 71 softens the material and enters the lid member 43 and a portion of the caliper body main body 46 adjacent to it while moving until it reaches a withdrawal point (described later) where it is withdrawn from the caliper body main body 46. Reference numeral 80 denotes a recess formed by the end surface of the large-diameter shaft portion 72 of the joining tool 71 at the final position of the friction stir welding process. That is, the end surface of the large-diameter shaft portion 72 partially softens the material by friction while moving until it reaches the final position. The straight line extending from the recess 80 shows the locus of the large-diameter shaft portion 72. Upon returning to the welding start position on the outer periphery of the lid member 43, the joining tool 71 is moved toward the corresponding bulge portion 54 on the outside of the flange portion 52 along the tangential direction to the circumference of the joint interface of the lid member 43. Upon completion of the movement to the center of the bulge portion 54, the joining tool 71 is withdrawn from the caliper body main body 46.

Thus, the lid member 43 is welded to the opening 45 over the entire circumference thereof, and a residual impression 78 due to the friction stir welding process is formed on the bulge portion 54 on the outside of the flange portion 52. It should be noted that the residual impression 78 is formed only at the withdrawal point where the joining tool 71 is withdrawn from the caliper body main body 46, and consists of a center hole 79 corresponding to the tip shaft portion 73 of the joining tool 71 and a peripheral recess 80 corresponding to the large-diameter shaft portion 72 of the joining tool 71. The residual impression 78 is formed as a recess in which the center hole 79 is the deepest. However, because the residual impression 78 is formed on the bulge portion 54, which is radially outwardly away from the joint region 77 of the lid member 43, it will not cause degradation of the mounting strength of the lid member 43 or a fluid leakage.

In this embodiment, in particular, the bulge portion 54 is formed at the front end of each rib 55 as a reinforcing member that connects the two cylinder portions 20 and 21. Therefore, the withdrawing operation of the joining tool 71 can be performed stably. In addition, the strength of the peripheral edge of the flange portion 52 can be increased by the ribs 55.

According to the foregoing first embodiment, each lid member 43 is secured to the opening 45 of the caliper body main body 46 by friction stir welding. Therefore, the bottom of the caliper body main body 46 need not have an increased wall thickness as in the case where the lid member 43 is secured by thread engagement. In addition, the lid member 43 can be integrally joined to the caliper body main body 46 in a hermetically sealed state.

Particularly, in this embodiment, the bottom of each bore 26 of the caliper body main body 46 is formed with the section of the flange portion 52 having a larger outer diameter than that of the general surface 51a of the outer peripheral wall 51 of the bore 26. Therefore, friction stir welding of the lid member 43 can be surely performed by utilizing the flange portion 52. In addition, it is possible to reduce the overall weight of the caliper body main body 46 by minimizing the outer diameter of the general surface 51a of the outer peripheral wall 51. The structure that the flange portion 52 and the general surface 51a are connected by the slant surface 51c, which gradually increases in diameter toward the end surface of the caliper body main body 46, also contributes to the reduction in the overall weight of the caliper body main body 46. Further, the slant surface 51c is provided on a region of the outer peripheral wall 51 adjacent to the outer periphery of a surface of the bottom of the caliper body main body 46 that borders the bore 26. Accordingly, it is possible to reduce the overall weight of the caliper body main body 46 as much as possible while ensuring the required strength of the flange portion 52.

It should be noted that reference symbol L in FIG. 10 shows the wall thickness of the caliper body main body of the conventional disk brake in a case where a welding margin of the same area as in this embodiment is ensured for the bottom surface of the caliper body main body 46.

Figure 13:
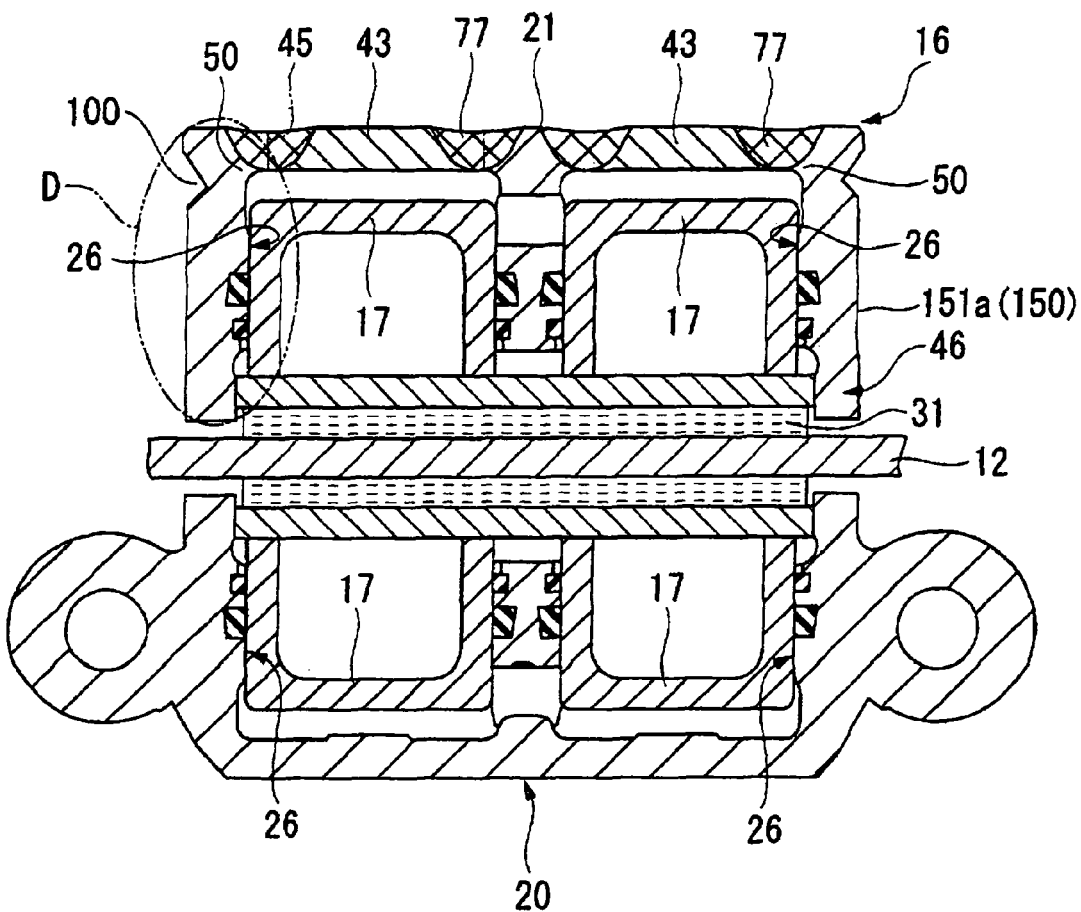
FIG. 13 is a sectional view similar to FIG. 2, showing a second embodiment of the present invention.
Figure 14:
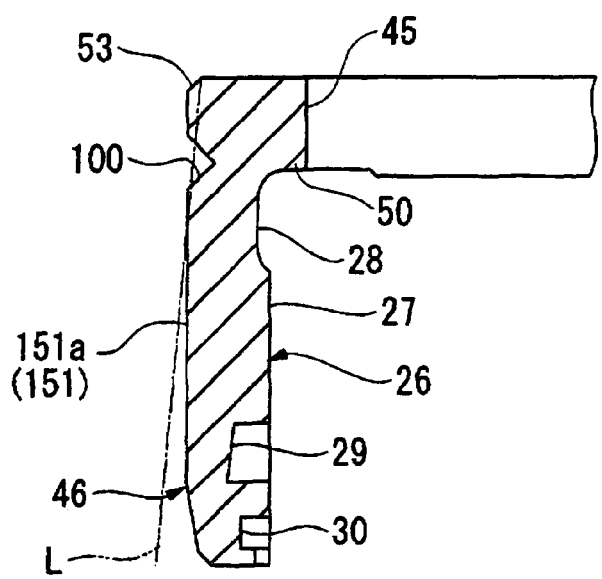
FIG. 14 is an enlarged view of part D in FIG. 13, showing the second embodiment.

Next, a second embodiment of the present invention will be described with reference to FIGS. 13 and 14. It should be noted that in the following embodiments the same members or portions as those in the first embodiment are denoted by the same reference symbols as in the first embodiment, and a redundant description is omitted.

The brake of this embodiment is similar in the basic structure to the first embodiment. The difference between the two embodiments is as follows. In the first embodiment, the flange portion 52, which has a section larger in diameter than the general surface 51a of the outer peripheral wall 51 of the corresponding bore 26, is provided on the bottom of the caliper body main body 46 (i.e. on the outer peripheral surface of the portion thereof where the openings 45 are formed). In this embodiment, the outer peripheral surface of the portion of the caliper body main body 46 where each opening 45 is formed has substantially the same outer diameter as that of the general surface 151a of the outer peripheral wall 151 of the bore 26, and a notch-shaped annular recess 100 (small-diameter portion) is formed on the outer peripheral wall 151 at a position adjacent to the outer peripheral surface of the portion of the caliper body main body 46 where the opening 45 is formed.

In this embodiment, the wall thickness of the outer peripheral wall 151 can be reduced because of the provision of the annular recess 100 at a position adjacent to the outer peripheral surface of the portion of the caliper body main body 46 where the opening 45 is formed. Accordingly, while a welding margin of the same area is ensured for the bottom surface of the caliper body main body 46, the overall weight of the caliper body main body 46 can be reduced as compared to the conventional disk brake as in the case of the first embodiment. It should be noted that reference symbol L in FIG. 14 shows the wall thickness of the caliper body main body of the conventional disk brake. In this embodiment also, the parting line formed during the casting process is substantially perpendicular to a plane containing the rotational direction of the disk 12 in the same way as in the first embodiment, and the casting die release direction is vertical relative to the caliper body main body 46.

Figure 15:
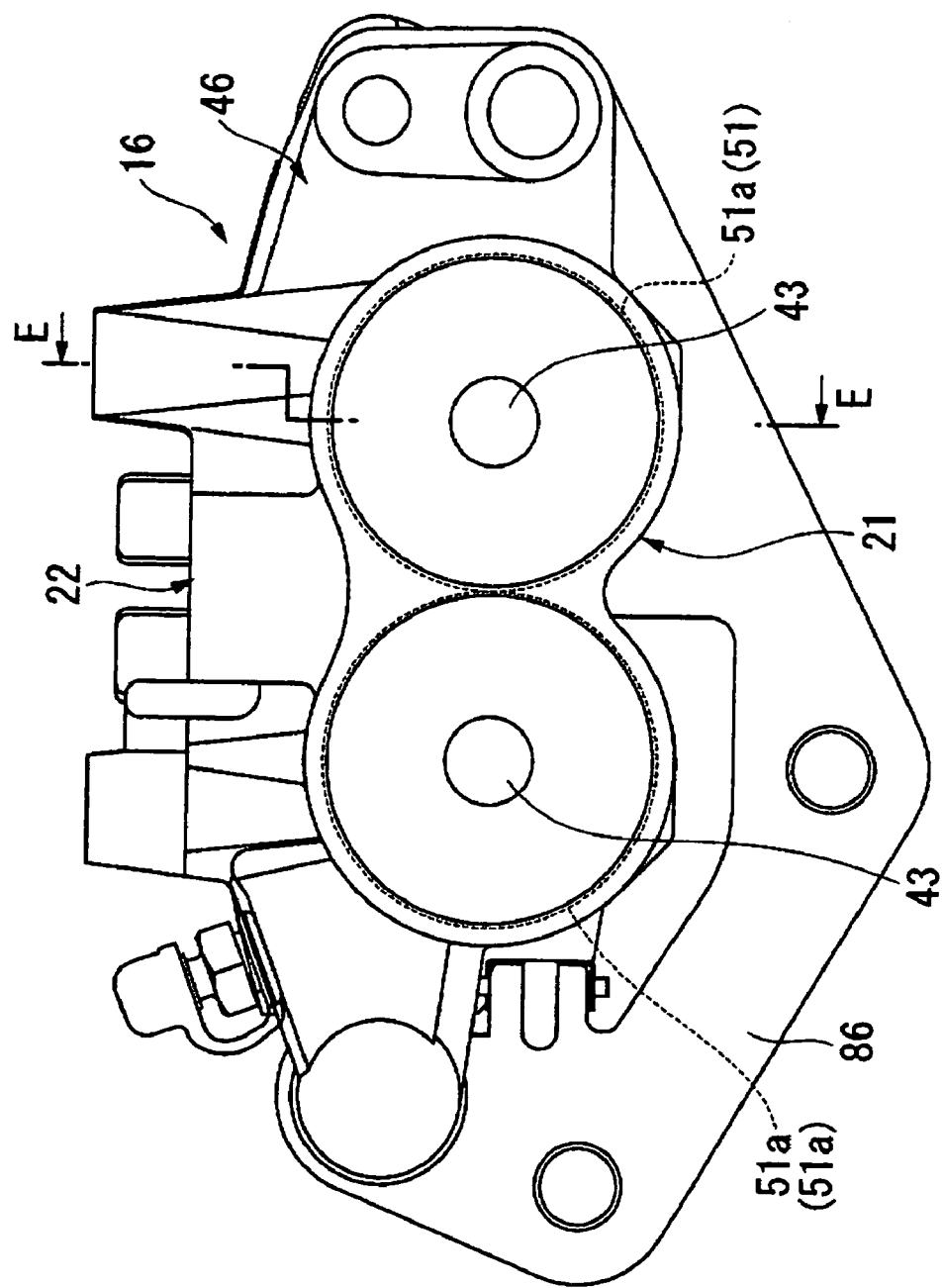
FIG. 15 is a rear view of a caliper body, showing a third embodiment of the present invention.
Figure 16:
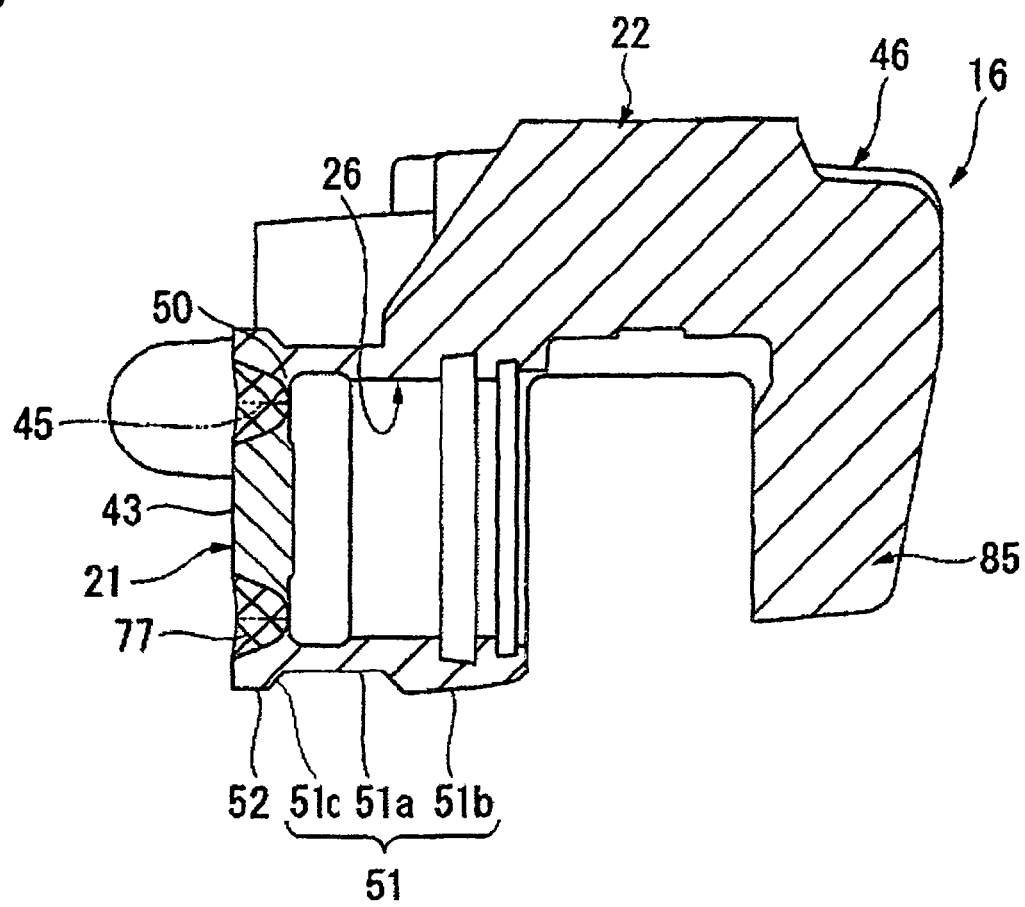
FIG. 16 is a sectional view of the caliper body corresponding to the section E-E in FIG. 15, showing the third embodiment.

Subsequently, a third embodiment of the present invention will be described with reference to FIGS. 15 to 17.

In this embodiment, the outer side of the caliper body 16 is composed of an outer claw portion 85 having no piston in place of the outer cylinder portion in the first embodiment. Accordingly, only the inner cylinder portion 21 is provided with bores 26 parallel to the disk axial direction. The caliper body 16 of this embodiment is of the floating type in which the caliper body 16 supports pads and is slidably supported by a carrier 86 secured to a non-rotating part of the vehicle. The pads are pressed against the disk by the pistons and the outer claw portion 85, thereby generating a braking force to the vehicle.

In the caliper body main body 46, the outer claw portion 85 and the inner cylinder portion 21 are connected by the disk pass portion 22, and these portions are produced as an integral component except the bottom of the inner cylinder portion 21. At the bottom of the inner cylinder portion 21, openings 45 having a smaller inner diameter than those of the bores 26 are formed in the same way as in the first embodiment. In addition, an annular bottom wall 50 is formed to surround each opening 45, and a discrete lid member 43 is secured to the opening 45 by friction stir welding in the same way as in the first embodiment.

The caliper body main body 46 has a flange portion 52 formed on a portion thereof at the bottom of the bores 26. The flange portion 52 has a section of a larger outer diameter than that of the general surface 51a of the outer peripheral wall 51 of the corresponding bore 26.

Figure 17:
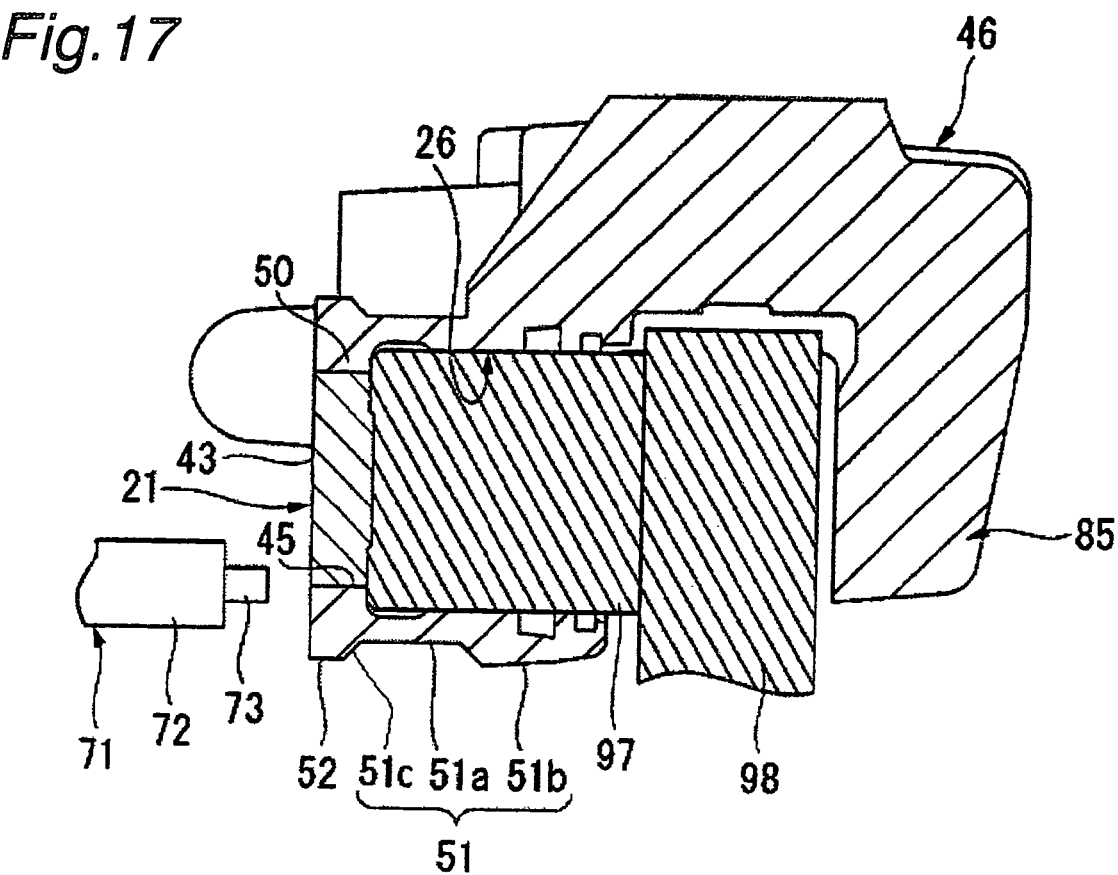
FIG. 17 is a sectional view showing the way in which lid members are attached to the caliper body in the third embodiment.

When a lid member 43 is to be joined to each opening 45 by friction stir welding, as shown in FIG. 17, a support post 97 is inserted into the bore 26 of the caliper body main body 46, and the top of the support post 97 is abutted against the back side of the annular bottom wall 50. In this state, the lid member 43 is fitted into the opening 45, and the back side of the lid member 43 is abutted against the top of the support post 97, thereby positioning the lid member 43 with respect to the caliper body main body 46. In this state, friction stir welding is applied to the joint interface between the lid member 43 and the opening 45.

In this embodiment, the bottom of the bore 26 is formed with the flange portion 52 having a corresponding section of a larger outer diameter than that of the general surface 51a of the outer peripheral wall 51 of the bore 26 in the same way as the first embodiment. Therefore, friction stir welding of the lid member 43 can be surely performed by utilizing the flange portion 52. In addition, it is possible to reduce the overall weight of the caliper body main body 46 by minimizing the outer diameter of the general surface 51a of the outer peripheral wall 51. The structure that the flange portion 52 and the general surface 51a are connected by the slant surface 51c, which gradually increases in diameter toward the end surface of the caliper body main body 46, also contributes to the reduction in the overall weight of the caliper body main body 46. Further, the slant surface 51c is provided on a region of the outer peripheral wall 51 adjacent to the outer periphery of a surface of the bottom of the caliper body main body 46 that borders the bore 26. Accordingly, it is possible to reduce the overall weight of the caliper body main body 46 as much as possible while ensuring the required strength of the flange portion 52.

In this embodiment also, the parting line formed during the casting process is substantially perpendicular to a plane containing the rotational direction of the disk 12 in the same way as in the first embodiment, and the casting die release direction is vertical relative to the caliper body main body 46.

It is also possible in this embodiment to form an annular recess (small-diameter portion) on the outer peripheral wall 51 at a position adjacent to the outer peripheral surface of the portion of the caliper body main body 46 where the opening 45 is formed, instead of forming the flange portion 52 at the bottom of the bore 26.

Figure 18:
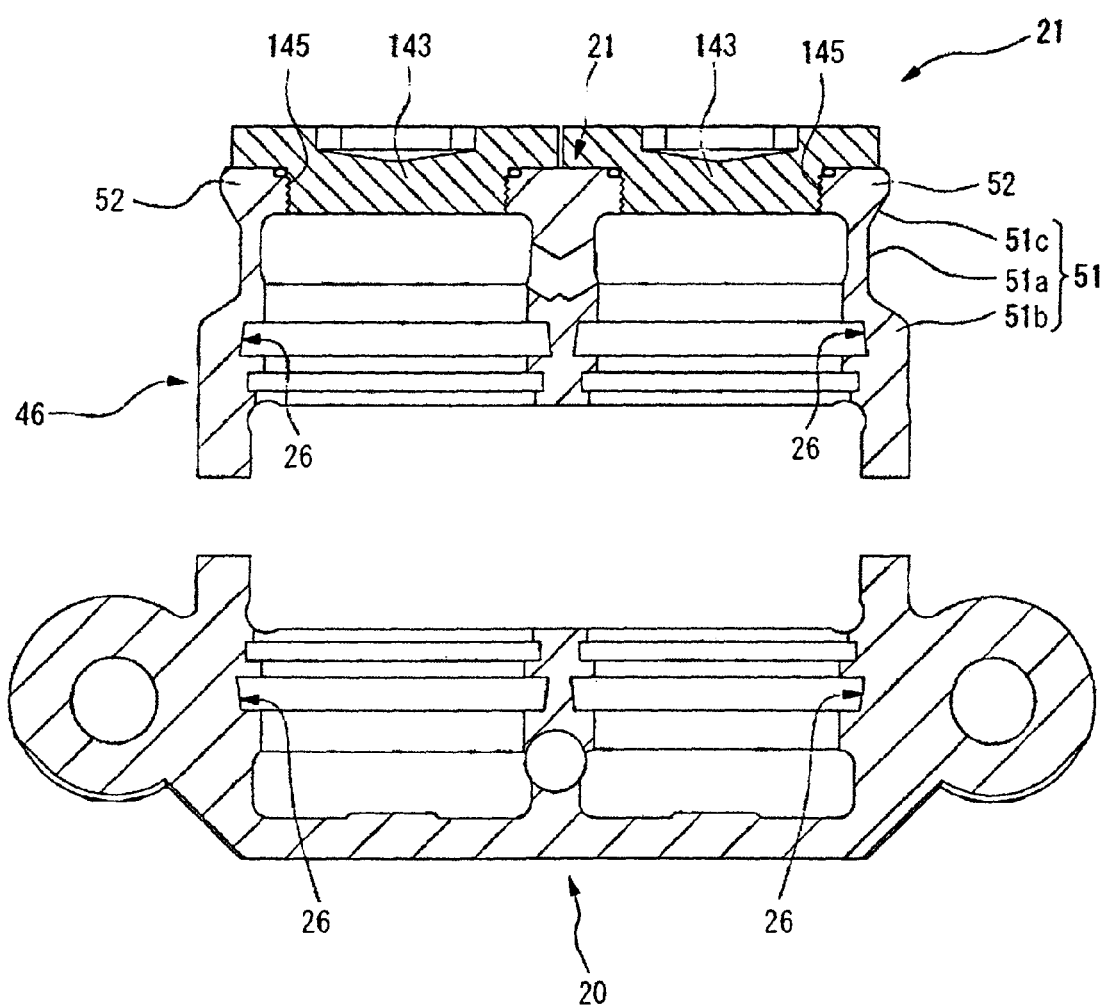
FIG. 18 is a sectional view of a caliper body, showing a fourth embodiment of the present invention.

FIG. 18 shows a fourth embodiment of the present invention.

In this embodiment, the outer peripheral surface of the portion of the caliper body main body 46 where each opening 145 is formed is integrally formed with a section of the flange portion 52 having a larger outer diameter than that of the general surface 51a of the outer peripheral wall 51 of the bore 26 in the same way as in the first embodiment. In this embodiment, however, the lid members 143 are secured to the openings 145, respectively, by thread engagement, whereas in the first embodiment the lid members 43 are joined to the openings 45 by friction stir welding.

This embodiment differs from the first embodiment in the method of securing the lid members 143 but effectively utilizes the flange portion 52 having a section of a larger outer diameter than that of the general surface 51a of the outer peripheral wall 51 of the corresponding bore 26 in the same way as the first embodiment. Accordingly, the lid members 143 can be supported with a sufficient strength by virtue of the wall thickness of the flange portion 52. In addition, it is possible to reduce the overall weight of the caliper body main body 46 by minimizing the outer diameter of the general surface 51a of the outer peripheral wall 51. In this embodiment also, the parting line formed during the casting process is substantially perpendicular to a plane containing the rotational direction of the disk in the same way as in the foregoing embodiments.

It is also possible in this embodiment to form an annular recess 100 on the outer peripheral wall 51 of each bore 26 instead of forming at the bottom of the caliper body main body 46 the flange portion 52 having a section of a larger diameter than that of the general surface 51a of the outer peripheral wall 51.

It should be noted that the present invention is not necessarily limited to the foregoing embodiments but can be modified in a variety of ways without departing from the gist of the present invention.

What is claimed is:

1. A disk brake for pressing a brake pad against a disk, the disk brake comprising:
   a cylinder comprising:
      a cylinder body having a bore and an opening at a bottom thereof, the bore adapted to have a piston slide therein, in response to a fluid pressure, to press the brake pad against the disk; and
      a lid member that closes the opening,
   wherein said lid member is joined to said cylinder body by friction stir welding, and
   wherein said cylinder body has a bottom portion located at said bottom of said cylinder body where the opening is formed, and
   wherein said bottom portion has:
      an outer end surface disposed opposite from a surface bordering the bore in an axial direction of said cylinder body;
      an outer peripheral surface with an outer diameter that is larger than an outer diameter of a minimum outer diameter portion of an outer peripheral wall of the bore of said cylinder body; and
      a bulge portion projecting radially outward from a part of said outer peripheral surface, said bulge portion having a flat surface continuous from the outer end surface of said bottom portion, and said bulge portion being an end point of the friction stir welding.

2. A disk brake according to claim 1, wherein said outer peripheral surface of said bottom portion has a chamfer formed thereon, said chamfer narrowing toward the outer end surface of said cylinder body.

3. A disk brake according to claim 1, further comprising a brake caliper having said cylinder body, said brake caliper being formed so that a parting line of a casting die extends substantially perpendicular to a plane containing a rotational direction of the disk.

4. A disk brake according to claim 1, wherein said outer peripheral surface of said bottom portion and said minimum outer diameter portion of said outer peripheral wall of the bore are connected to each other by a slant surface that gradually increases in diameter toward said outer end surface of said bottom portion of said cylinder body.

5. A disk brake according to claim 4, wherein said slant surface is provided on a region of said outer peripheral wall adjacent to an outer peripheral region of said surface of said bottom portion of said cylinder body that borders the bore.

6. A disk brake according to claim 1, wherein said cylinder body is made from an aluminum cast, and said lid member is made of aluminum.

7. A disk brake according to claim 1, further comprising:
a rib; and
another cylinder comprising another cylinder body having another bore adapted to have another piston slide therein, in response to a fluid pressure, to press another brake pad against the disk, whereby there is a pair of cylinders, wherein
said cylinder and said other cylinder are provided on opposite sides of the disk,
said rib extends over an outer peripheral surface of the disk and connects said pair of cylinders,
the opening is provided at said bottom of said cylinder body of said cylinder of said pair of cylinders, and
said bulge portion is provided at a position corresponding to said rib as viewed in a disk axial direction on said outer peripheral surface of said bottom portion of said cylinder body where the opening is formed.

8. A disk brake according to claim 1, wherein
said cylinder body has another bore and another opening at said bottom thereof, whereby there are two bores in said cylinder body and two openings at said bottom of said cylinder body, the bores being separated from each other in a circumferential direction of the disk, each of the bores being adapted to have a piston slide therein, in response to a fluid pressure, to press the brake pad against the disk, and each of the two openings being provided in a respective one of the two bores at said bottom of said cylinder body,
said cylinder body has another bottom portion located at said bottom of said cylinder body where the other opening is formed, said other bottom portion having another outer end surface, another outer peripheral surface with an outer diameter that is larger than an outer diameter of a minimum outer diameter portion of an outer peripheral wall of the other bore of said cylinder body, and another bulge portion projecting radially outward from a part of said other outer peripheral surface, said other bulge portion having a flat surface continuous from the other outer end surface of the other bottom portion, and said other bulge portion being an end point of the friction stir welding.

9. A disk brake according to claim 1, wherein said lid member and said cylinder body are joined at an outer periphery of said lid member and an inner periphery of the opening of said cylinder body by the friction stir welding.

10. A disk brake according to claim 1, wherein the flat surface of said bulge portion and the outer end surface of said bottom portion are on a same plane.

11. A disk brake for pressing a brake pad against a disk, the disk brake comprising:
a cylinder comprising:
a cylinder body having a bore and an opening at a bottom thereof, the bore adapted to have a piston slide therein, in response to a fluid pressure, to press the brake pad against the disk; and
a lid member that closes the opening,
wherein said lid member is joined to said cylinder body by friction stir welding,
wherein said cylinder body has a bottom portion where the opening is formed,
wherein said bottom portion has:
an outer end surface disposed opposite from a surface bordering the bore in an axial direction of said cylinder body;
an outer peripheral surface, said outer peripheral surface of said bottom portion having an outer diameter that is larger than an outer diameter of a small-diameter portion formed on a region of another outer peripheral surface of said cylinder body that is adjacent to said outer peripheral surface of said bottom portion; and
a bulge portion projecting radially outward from a part of said outer peripheral surface of said bottom portion, said bulge portion having a flat surface continuous from the outer end surface of said bottom portion, and said bulge portion being an end point of the friction stir welding.

12. A disk brake according to claim 11, wherein said outer peripheral surface of said bottom portion has a chamfer formed thereon, said chamfer narrowing toward the outer end surface of said cylinder body.

13. A disk brake according to claim 11, further comprising a brake caliper having said cylinder body, said brake caliper being formed so that a parting line of a casting die extends substantially perpendicular to a plane containing a rotational direction of the disk.

14. A disk brake according to claim 11, wherein said cylinder body is made from an aluminum cast, and said lid member is made of aluminum.

15. A disk brake according to claim 11, further comprising:
a rib; and
another cylinder having another cylinder body having another bore adapted to have another piston slide therein, in response to a fluid pressure, to press another brake pad against the disk, whereby there is a pair of cylinders, wherein
said cylinder and said other cylinder are provided on opposite sides of the disk,
said rib extends over an outer peripheral surface of the disk and connects said pair of cylinders,
the opening is provided at a bottom of said cylinder body of said cylinder of said pair of cylinders, and
said bulge portion is provided at a position corresponding to said rib as viewed in a disk axial direction on said outer peripheral surface of said bottom portion of said cylinder body where the opening is formed.

16. A disk brake according to claim 11, wherein said lid member and said cylinder body are joined at an outer periphery of said lid member and an inner periphery of the opening of said cylinder body by the friction stir welding.

17. A method for manufacturing a disk brake for pressing a brake pad against a disk with a piston that slides in a bore of a cylinder in response to a fluid pressure in the bore, the method comprising:
preparing a cylinder body having the bore and an opening at a bottom thereof and a lid member for closing the opening to form the cylinder, the cylinder body having a bottom portion located at the bottom of the cylinder body where the opening is formed, wherein the bottom portion has:
an outer end surface disposed opposite from a surface bordering the bore in an axial direction of the cylinder body;
an outer peripheral surface with an outer diameter that is larger than an outer diameter of a minimum outer diameter portion of an outer peripheral wall of the bore of the cylinder body; and
a bulge portion projecting radially outward from a part of the outer peripheral surface, the bulge portion having a flat surface continuous from the outer end surface of the bottom portion;
friction stir welding along a whole circumference of the lid member using a joining tool while the lid member is fitted in the opening of the cylinder body; and
moving the joining tool toward the bulge portion, and pulling out the joining tool from the cylinder body after completion of said moving of the joining tool to the bulge portion so that an end point of said friction stir welding is located at the bulge portion.

18. A method for manufacturing the disk brake according to claim 17, wherein the disk brake further comprises:
a rib; and
another cylinder having another cylinder body having another bore adapted to have another piston slide therein, in response to a fluid pressure, to press another brake pad against the disk, whereby there is a pair of cylinders, wherein the cylinder and the other cylinder are provided on opposite sides of the disk,
the rib extends over an outer peripheral surface of the disk and connects the pair of cylinders,
the opening is provided at the bottom of the cylinder body of the cylinder of the pair of cylinders, and
the bulge portion is provided at a position corresponding to the rib as viewed in a disk axial direction on the outer peripheral surface of the bottom portion of the cylinder body where the opening is formed.

19. A method for manufacturing the disk brake according to claim 17, wherein the outer peripheral surface of the bottom portion has a chamfer formed thereon, the chamfer narrowing toward the outer end surface of the cylinder body.

20. A method for manufacturing the disk brake according to claim 17, wherein the outer peripheral surface of the bottom portion and the minimum outer diameter portion of the outer peripheral wall of the bore are connected to each other by a slant surface that gradually increases in diameter toward the outer end surface of the bottom portion of the cylinder body.

21. A method for manufacturing the disk brake according to claim 20, wherein the slant surface is provided on a region of the outer peripheral wall adjacent to an outer peripheral region of the surface of the bottom portion of the cylinder body that borders the bore.

* * * * *